US010800553B2

(12) United States Patent
Safai (10) Patent No.: US 10,800,553 B2
(45) Date of Patent: Oct. 13, 2020

(54) SOLAR RADIOGRAPHY FOR NON-DESTRUCTIVE INSPECTION (71) Applicant: THE BOEING COMPANY, Chicago, IL (US)

(72) Inventor: Morteza Safai, Newcastle, WA (US)

(73) Assignee: THE BOEING COMPANY, Chicago, IL (US)

(*) Notice: Subject to any disclaimer, the term of this patent is extended or adjusted under 35 U.S.C. 154(b) by 180 days.

(21) Appl. No.: 16/206,647

(22) Filed: Nov. 30, 2018

(65) Prior Publication Data
US 2020/0172270 A1 Jun. 4, 2020

(51) Int. Cl.
G01N 21/88 (2006.01)
G01J 5/10 (2006.01)
G01J 5/00 (2006.01)
B64G 1/44 (2006.01)
G01T 1/20 (2006.01)
H04W 4/80 (2018.01)
G05D 1/08 (2006.01)
G06K 9/64 (2006.01)

(52) U.S. Cl.
CPC .............. B64G 1/44 (2013.01); G01T 1/2006 (2013.01); G05D 1/08 (2013.01); G06K 9/64 (2013.01); H04W 4/80 (2018.02)

(58) Field of Classification Search
CPC ......... B64G 1/44; H04W 4/80; G01T 1/2006; G05D 1/08; G06K 9/64
See application file for complete search history.

(56) References Cited

U.S. PATENT DOCUMENTS

| 8,692,887 | B2* | 4/2014 | Ringermacher ...... G01J 5/0896 348/164 |
| 9,140,556 | B1* | 9/2015 | Sheikh ................. G01C 21/025 |
| 9,643,313 | B2* | 5/2017 | Hafenrichter .............. B25J 9/02 |
| 2012/0050537 | A1* | 3/2012 | Ringermacher ... G01B 11/0658 348/164 |
| 2016/0054233 | A1* | 2/2016 | Bense ..................... G01N 25/72 250/330 |
| 2016/0101463 | A1* | 4/2016 | Snyder .................. B29C 64/106 164/438 |
| 2016/0284075 | A1* | 9/2016 | Phan ........................ G06T 7/001 |
| 2017/0036783 | A1* | 2/2017 | Snyder .................. B29C 64/386 |
| 2017/0283085 | A1* | 10/2017 | Kearns ...................... B64F 5/60 |
| 2017/0373754 | A1* | 12/2017 | Davis ................. H04B 7/18515 |

* cited by examiner

Primary Examiner — Taeho Jo
(74) Attorney, Agent, or Firm — Patterson + Sheridan, LLP (57) ABSTRACT The present disclosure provides for Non-Destructive Inspection of craft operating in high-atmosphere or outer space, by positioning a scintillating detector array leeward to a structural element of the craft relative to the Sun; collecting, by the detector array while the craft is in flight, solar radiation passing through the structural element; and outputting a radiographic image based on the solar radiation collected to an image analyzer. The image analyzer may composite several images taken over a period of time or decomposite images of intervening structural elements from the radiographic images. Automated alerts for non-conformances between the radiographic images and earlier-taken or architectural images are provided to users.

20 Claims, 6 Drawing Sheets

FIG. 5

SOLAR RADIOGRAPHY FOR NON-DESTRUCTIVE INSPECTION

FIELD

The present disclosure relates to Non-Destructive Inspection (NDI), and more specifically, to radiography using the Sun as a radiation source in inspecting various structural elements.

BACKGROUND

The Earth's atmosphere shields objects from several forms of radiation produced by the Sun; however, at higher altitudes and in space, various craft may be exposed to different wavelengths that lower layers of the Earth's atmosphere would otherwise block or redirect. Several of these wavelengths blocked or redirected by the atmosphere include wavelengths that are transmissive through structural elements of craft operating at these altitudes, and the craft may include shielding to protect electronics or living beings from radiation of these wavelengths. Inspecting the structural elements of such craft while operating may be unfeasible due to the environment that the craft is operating in, thus delaying or preventing inspections until the craft is taken out of operation.

SUMMARY

The present disclosure provides a method for Non-Destructive Inspection of a spacecraft in one aspect, the method including: positioning a detector array leeward to a structural element of the spacecraft relative to the Sun; collecting, by the detector array while the spacecraft is in flight, solar radiation passing through the structural element; and outputting a radiographic image based on the solar radiation collected.

In one aspect, in combination with any example method above or below, positioning the detector array further comprises: maneuvering the spacecraft to present the structural element sunward relative to the detector.

In one aspect, in combination with any example method above or below, positioning the detector array further positions an additional structural element between the detector array and the Sun.

In one aspect, in combination with any example method above or below, the method includes, prior to outputting the radiographic image based on the solar radiation collected: merging the radiographic image with a masking view of the additional structural element to produce an unmasked view of the structural element.

In one aspect, in combination with any example method above or below, the method includes: calculating a trajectory of the spacecraft for collecting the solar radiation; and adjusting a gain of the detector array for collecting the solar radiation so that a scintillator of the detector array does not saturate over the trajectory.

In one aspect, in combination with any example method above or below, the trajectory includes multiple orbits that include an exposed region of the trajectory and a shielded region of the trajectory, wherein the detector array de-energizes while in the shielded region.

In one aspect, in combination with any example method above or below, the solar radiation collected is X-ray spectrum radiation.

The present disclosure provides a Solar Radiation Inspection System (SRIS) for Non-Destructive Inspection, the SRIS including: a detector array, including: a scintillator, configured to energize in response to collecting solar radiation passing through a physical structure; and an array of digital detectors corresponding to regions in the scintillator, each digital detector of the array configured to digitize a signal when a corresponding region in scintillator is energized; and an image analyzer, including: a processor; and a memory including program instructions that when executed by the processor enable the image analyzer to construct a radiographic image of the physical structure based on the digitized signals received from the detector array.

In one aspect, in combination with any example SRIS above or below, the SRIS includes an attachment feature for the detector array including at least one of: a hook and loop fastener; a bolt; an adhesive; a tie-down; a magnet; and a robotic arm with a selectively engaged clamp.

In one aspect, in combination with any example SRIS above or below, the SRIS includes a power source connected to the image analyzer including at least one of: a solar cell; and an umbilical cord to mate with an external power source of a spacecraft.

In one aspect, in combination with any example SRIS above or below, the SRIS includes a transceiver in communication with the image analyzer configured to transmit the radiographic image to an external computing device, the transceiver including at least one of: a Bluetooth transmitter; and a WiFi transmitter. In some aspects, the transceiver is configured to transmit the radiographic image when the scintillator is not collecting the solar radiation and to not transmit the radiographic image when the scintillator is collecting the solar radiation.

In one aspect, in combination with any example SRIS above or below, the image analyzer is further configured to merge a masking view of a first structural element with the radiographic image to decomposite the first structural element from a second structural element included in the radiographic image.

In one aspect, in combination with any example SRIS above or below, the image analyzer is configured to identify differences in the radiographic image relative to a schematic view of a structural element.

In one aspect, in combination with any example SRIS above or below, the scintillator is a durable scintillating material.

In one aspect, in combination with any example SRIS above or below, a gain of the detector array is selectively adjustable based on a time of exposure to the solar radiation and an intensity of the solar radiation.

The present disclosure provides a system for Non-Destructive Inspection in one aspect, the system including: a craft including a first structural element; a detector array, connected to the first structural element, wherein the detector array is selectively positionable to be behind the first structural element relative to the Sun, the detector array including a scintillator, configured to energize in response to collecting solar radiation and an array of digital detectors corresponding to regions in the scintillator, each digital detector of the array configured to produce a signal when a corresponding region in the scintillator is energized; and an image analyzer configured to receive digitized signals from the array of digital detectors and construct a radiographic image of the first structural element based on the digitized signals.

In one aspect, in combination with any example system above or below, the craft includes a second structural element, wherein the image analyzer is further configured to remove a masking view of the second structural element from the radiographic image to decomposite the first structural element and the second structural element in the radiographic image.

In one aspect, in combination with any example system above or below, the craft is a spacecraft configured to operate in outer space.

In one aspect, in combination with any example system above or below, the craft is an aircraft configured to operate at an altitude above the Troposphere.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

DETAILED DESCRIPTION

The present disclosure relates to the Non-Destructive Inspection (NDI) of various structural elements of in-flight craft. When NDI is performed on an in-flight craft, in one aspect, the tester does not permanently alter the structural elements or disassemble the structural elements, but examines the structural elements as currently installed in the craft. A Solar Radiation Inspection System (SRIS) provides for the NDI of craft exposed to solar radiation that is sufficiently energetic to pass through structural elements of those craft. In one aspect, the term craft refers to various spacecraft which include rockets, satellites, space stations, capsules, airplanes (including rocket-powered aircraft), and balloons. The spacecraft may operate in space (i.e., 100 km or more away from the Earth's surface) or the upper atmosphere (e.g. in the Stratosphere and Mesosphere). The craft include various structural elements that may require inspection at various times to ensure structural integrity, air-tightness, internal wiring/plumbing connections, etc.

The SRIS is positioned on the structural element to inspect, such that the structural element is between the SRIS and the Sun. The SRIS measures the solar radiation (i.e., radiation emitted by the Sun) that passes through the structural element and produces a radiographic image of the intervening structural element. In some aspects, an image analyzer identifies differences in the radiographic image and a known image of the structural element to identify faults, non-conformances, abnormalities, etc., in the structural element without exposing operators to the environment or halting operations of the craft. The collected solar radiation may pass through several layers of the craft (e.g., a first and a second hull element), and in such aspects the image analyzer produces an image of a desired structural element by removing a known image of undesired intervening structural elements as a masking view from the radiographic image of the composite elements.

In various aspects, an operator adjusts the gain of the SRIS to produce the radiographic image over several exposures to the Sun and to avoid saturating the detector array of the SRIS. In some aspects, the SRIS may use the craft as a power source, or may include a separate power source, such as a solar cell to power the SRIS independently from the craft.

Figure 1:
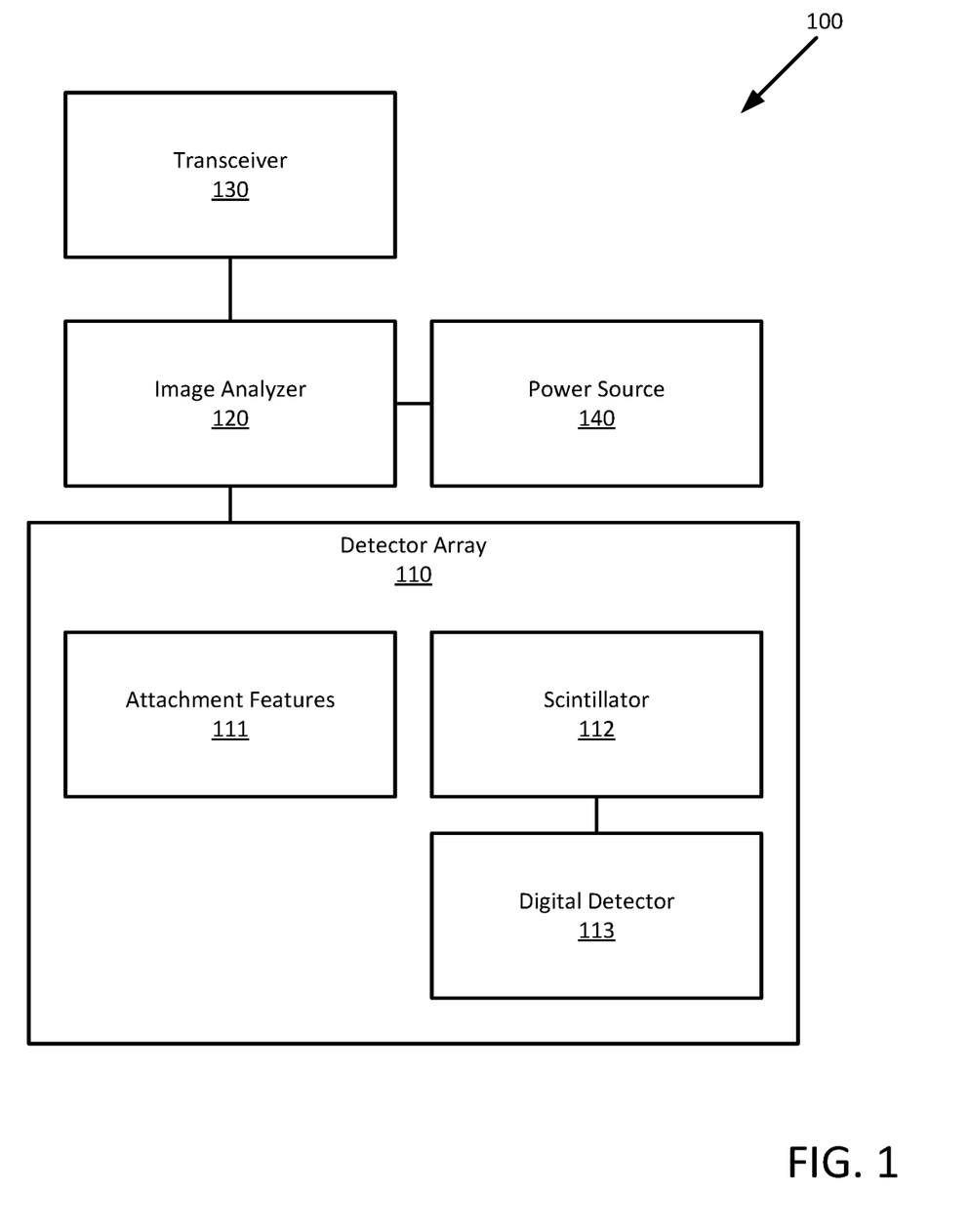
FIG. 1 illustrates example components of a Solar Radiation Inspection System, according to aspects of the present disclosure.

FIG. 1 illustrates example components of an SRIS 100, according to aspects of the present disclosure. The SRIS includes a detector array 110, an image analyzer 120 (discussed in greater detail in regard to FIG. 2), a transceiver 130, and a power source 140.

The detector array 110 includes various attachment features 111 to connect the detector array 110 to a structure undergoing NDI (not shown), a scintillator 112 that energizes when solar radiation passes through the structure undergoing NDI, and a digital detector 114 associated with the scintillator 112.

The attachment features 111 secure the detector array 110 to one or more surfaces of an element to be scanned during NDI. In various aspects, the attachment features 111 include a hook and loop fastener (e.g., VELCRO®) or hook/loop fasteners to mate with loop/hook fasteners integrated on a surface of the element to be scanned. In other aspects, the attachment features 111 include bolts/screws or a chemical adhesive (e.g., a glue, epoxy, or an adhesive tape). In further aspects, the attachment features include magnets. In additional aspects, the attachment features 111 include cords, ties, and straps (generally, tie-downs) that connect to various features on or near the element undergoing NDI (e.g., eyelets) and/or themselves via knots, clips, clamps, buckles, snaps, buttons, magnets, etc. In yet other aspects, the attachment features include 111 a robotic arm with a selectively engaged clamp or other mechanical "hand" by which the detector array 110 may move about an environment and secure itself to a structure.

The scintillator 112 includes one or more materials that produce light (i.e., luminescence) when excited or otherwise energized by ionizing radiation. As the detector array 110 may be used internally (in pressurized and/or temperature controlled regions) or externally to various craft (e.g., in near-vacuum, with temperatures ranging from 200° C. to below 200° C.), the materials used for are generally selected for mechanical and thermal ruggedness. Example durable scintillating materials include: inorganic scintillators such as LYSO (Lutetium Yttrium Silicon Oxides), CsI (Cesium Iodides), and CaWO (Calcium Tungsten Oxides) and organic scintillators such as polyethylene fluors. In various aspects, the scintillator 112 is divided into various regions in an ordered grid with regular divisions (e.g., with cross-sectional faces of squares, hexagons, circles, triangles, etc.), where each region is associated with a digital detector 113 of an array of digital detectors 113.

As the scintillator 112 receives radiation of a given range of wavelengths that the scintillating material is tuned for, the intensity of light produced is generally correlated to the intensity of radiation received. As the scintillator 112 is exposed to radiation for a longer time or to radiation of a higher intensity, the intensity of the light produced by the scintillator 112 increases over time, until the scintillator 112 reaches a saturation point. At the saturation point, the scintillator 112 is fully energized/excited, and produces a maximum amount of light until such time that the scintillator 112 is allowed to de-energize or return to an un-excited state. For example, a first region of the scintillator 112 exposed to stronger radiation than a second region of the scintillator 112 generally produces a stronger intensity light correlated to the stronger intensity of received radiation until the first region reaches the saturation point. In another example, exposing a first region of the scintillator 112 to radiation for a longer time than a second region of the scintillator 112 is exposed to the same intensity of radiation generally produces a stronger intensity light correlated to the longer time of reception until the first region reaches the saturation point. An operator or the image analyzer 120 may set a gain for the scintillator 112 (e.g., by a radiation shield, exposure time, aperture size) so that the scintillator 112 does not reach the saturation point during a given scan for NDI.

The digital detectors 113 register the intensity of the luminesce of the scintillator 112 at various locations. In some aspects, the digital detectors 113 are arranged in a known pattern along the associated portions or regions of the scintillator 112 such that each digital detector 113 provides a reading from a known location to the image analyzer 120. The image analyzer 120 uses the intensity readings from several digital detectors 113 in a known pattern corresponding to the scintillator 112 as imaging data (e.g., for hue values in a pixels) to produce a radiographic image.

The transceiver 130 includes various wireless (e.g., WiFi, Bluetooth, or another communications standard) and wireline communications systems and the associated antennas or ports used in those communications standards to receive and transmit data to/from the image analyzer 120 and an external computing device. In some aspects, the transceiver 130 selectively transmits data when the detector array 110 is not active or not receiving ionizing radiation. In some aspects, the transceiver 130 is omitted or integrated into the image analyzer 120.

The power source 140 provides electric power to the various components of the SRIS 100. Various examples of power sources 140 include batteries (rechargeable and non-rechargeable), solar cells, and umbilical or power cords to connect a power source on the craft undergoing NDI to the SRIS 100. In some aspects, the power source 140 is selectively detachable/attachable from the rest of the SRIS 100, and may be connected to the other components via power cabling of a customizable length to allow the other components of the SRIS 100 to be positioned independently of where the power source 140 is positioned. For example, when using a solar cell as a power source 140, solar cells are positioned in the sunlight, while the detector array 110 is positioned in the shade (i.e., not in the sunlight).

Figure 2:
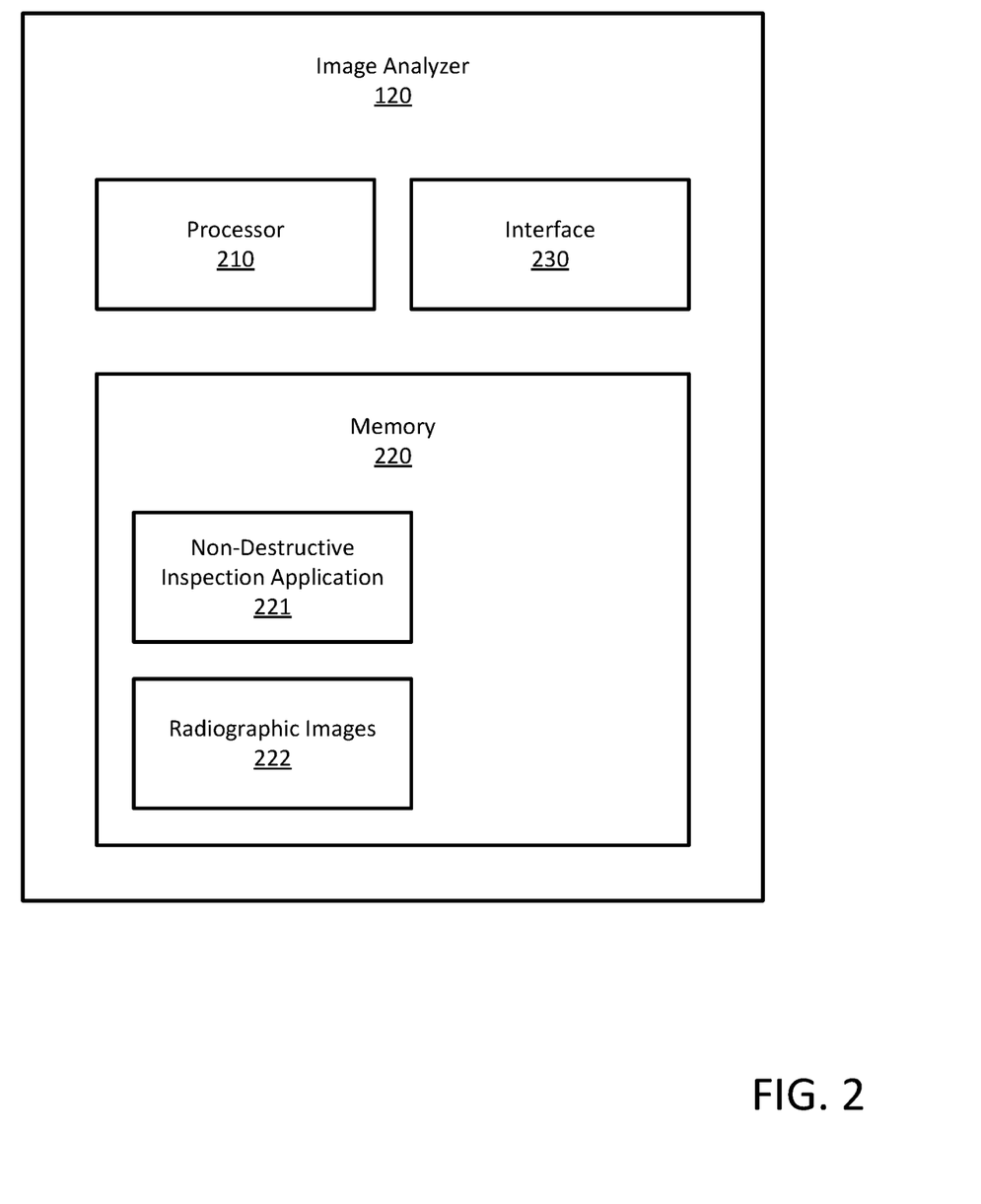
FIG. 2 illustrates example computing components of an image analyzer, according to aspects of the present disclosure.

FIG. 2 illustrates example computing components of an image analyzer 120 as discussed in relation to a SRIS 100 discussed in relation to FIG. 1. The image analyzer 120 receives the digitized data from the detector array 110 and builds a radiographic image from the digitized data and provides control and image processing functionality to a user during an NDI processes. The image analyzer includes a processor 210, a memory 220, and an interface 230. The processor 210 and the memory 220 provide computing functionality to the SRIS 100. The processor 210, which may be any computer processor capable of performing the functions described herein, executes commands based on inputs received from a user and the data received from the detector array 110. The memory 220 may be one or more memory devices, such as, for example, Random Access Memory (RAM), Read Only Memory (ROM), flash memory, or any other type of volatile or non-volatile storage medium that includes instructions that the processor 210 may execute. The interface 230 connects the image analyzer 120 to external devices, such as, for example, external memory devices, a transceiver 130, a detector array 110, a power source 140, a keyboard, a mouse, a monitor, etc., and may include various connection ports (e.g., Universal Serial Bus (USB), Firewire, Ethernet, coaxial jacks) and cabling.

The memory 220 generally includes various processor-executable instructions, that when executed by the processor 210, perform the various functions related to NDI discussed herein. The processor-executable instructions may generally be described or organized into various "applications" or "modules" in the memory 220, although alternate implementations may have different functions and/or combinations of functions. The memory 220 also generally includes data structures that store information for use by or output by the various applications or modules. In the present disclosure, the memory 220 includes at least instructions for an NDI application 221 and data structures for various radiographic images 222.

The radiographic images 222 are produced from solar radiation received by the detector array 110 over a period of time and illustrate the transmissivity of various elements placed in front of the detector array 110 to solar radiation. In various aspects, the radiographic images 222 are two-dimensional images created via projected radiography using the Sun as a beam projector. In other aspects, the radiographic images 222 are three-dimensional images created from several two-dimensional images via a Computed Tomographic (CT) process in which the detector array 110 (or the craft/elements being imaged) are repositioned relative to the Sun to provide different views of the craft/elements being imaged.

Figure 3:
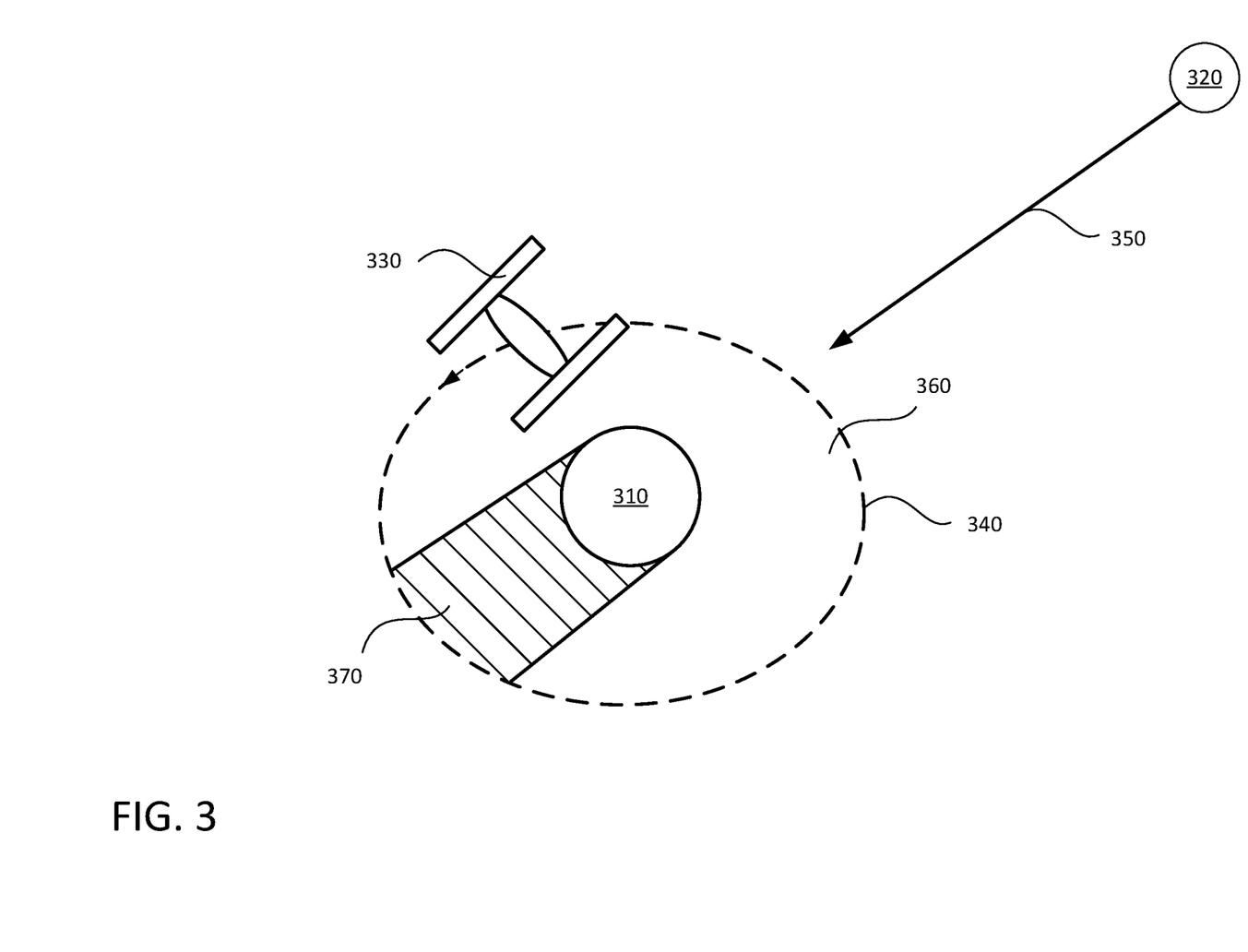
FIG. 3 illustrates a view of an environment available for Non-Destructive Inspection, according to aspects of the present disclosure.

FIG. 3 illustrates a view of an environment available for NDI according to aspects of the present disclosure. The environment includes an object 310 receiving solar radiation 350 from the Sun 320. The solar radiation 350 includes light in several wavelengths as produced by the Sun 320 and propagated through space. The solar radiation 350 includes waves in or near the X-ray spectrum (e.g., with wavelengths between 0.001 nanometers and 100 nanometers) used for NDI by the SRIS 100 as well as other waves (e.g., infrared light, visible light, ultraviolet light, gamma rays) that are not used for NDI according to aspects of the present disclosure.

In various aspects, the object 310 is the Earth, while in other aspects, the object 310 is an asteroid, a comet, an extraterrestrial planet (e.g., Mars, Venus), a moon (e.g., Luna (i.e., the Moon), Triton, Ganymede), etc. A craft 330 subject to NDI travels in a trajectory 340 relative to the object 310, such as, for example, an orbit around the Earth or a flightpath in and out of various regions of the Earth's atmosphere. The trajectory 340 defines two regions of travel based on the solar radiation 350; an exposed region 360, in which the craft 330 is exposed to the solar radiation 350 used for NDI, and a shielded region 370, in which the craft 330 is not exposed to the solar radiation 350 used for NDI due to the object 310 shielding the craft from the solar radiation 350. Although the illustrated environment shows the shielded region 370 to be in the "shadow" of the object 310 relative to the Sun 320, in other aspects, an atmosphere of the object 310 (or a second object) may provide the shielded region 370.

In one example, the craft 330 is the International Space Station (ISS), which orbits the Earth (e.g., the object 310) in Low Earth Orbit (LEO) and passes behind the Earth relative to the Sun 320 (entering the shielded region 370) several times per day. In another example, the craft 330 is a high-altitude aircraft operating above and below the Tropopause (i.e., between the Troposphere and the Stratosphere) such that the portions of a flightpath operating above the Tropopause correspond to the exposed region 360 and the portions operating below the Tropopause correspond to the shielded region 370, as the atmosphere attenuates the solar radiation 350 used for NDI. In another example, the craft 330 is a satellite that orbits the Moon (e.g., the object 310) in a Lunar stationary orbit, such that the satellite maintains a near-constant position relative to the surface of the Moon, and enters/exits the shielded region 370 as the Moon transitions between day and night or the Earth's shadow shields the satellite from the Sun 320.

Figure 4A:
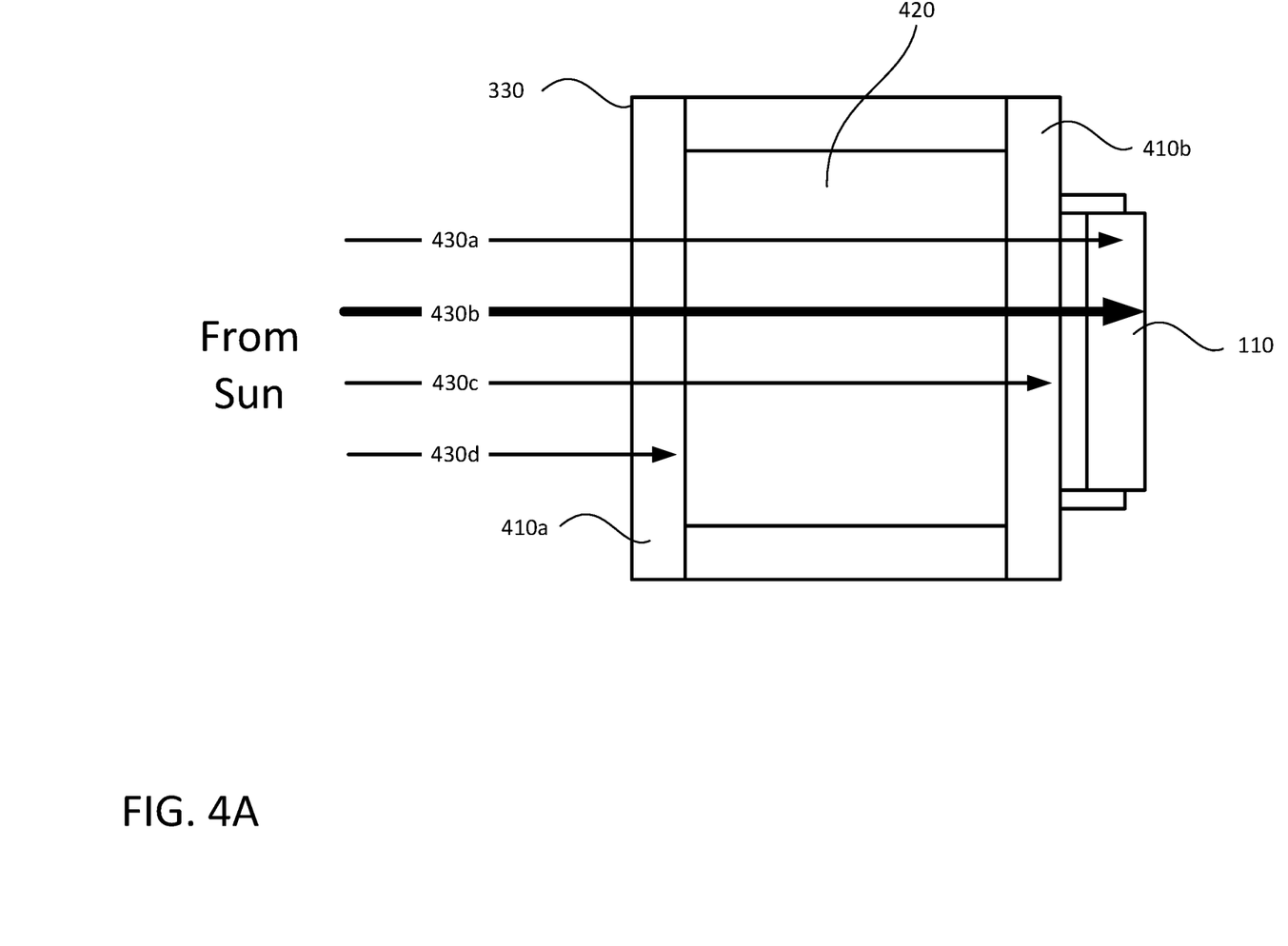
FIGS. 4A and 4B illustrate positions of a Solar Radiation Inspection System for Non-Destructive Inspection, according to aspects of the present disclosure.
Figure 4B:
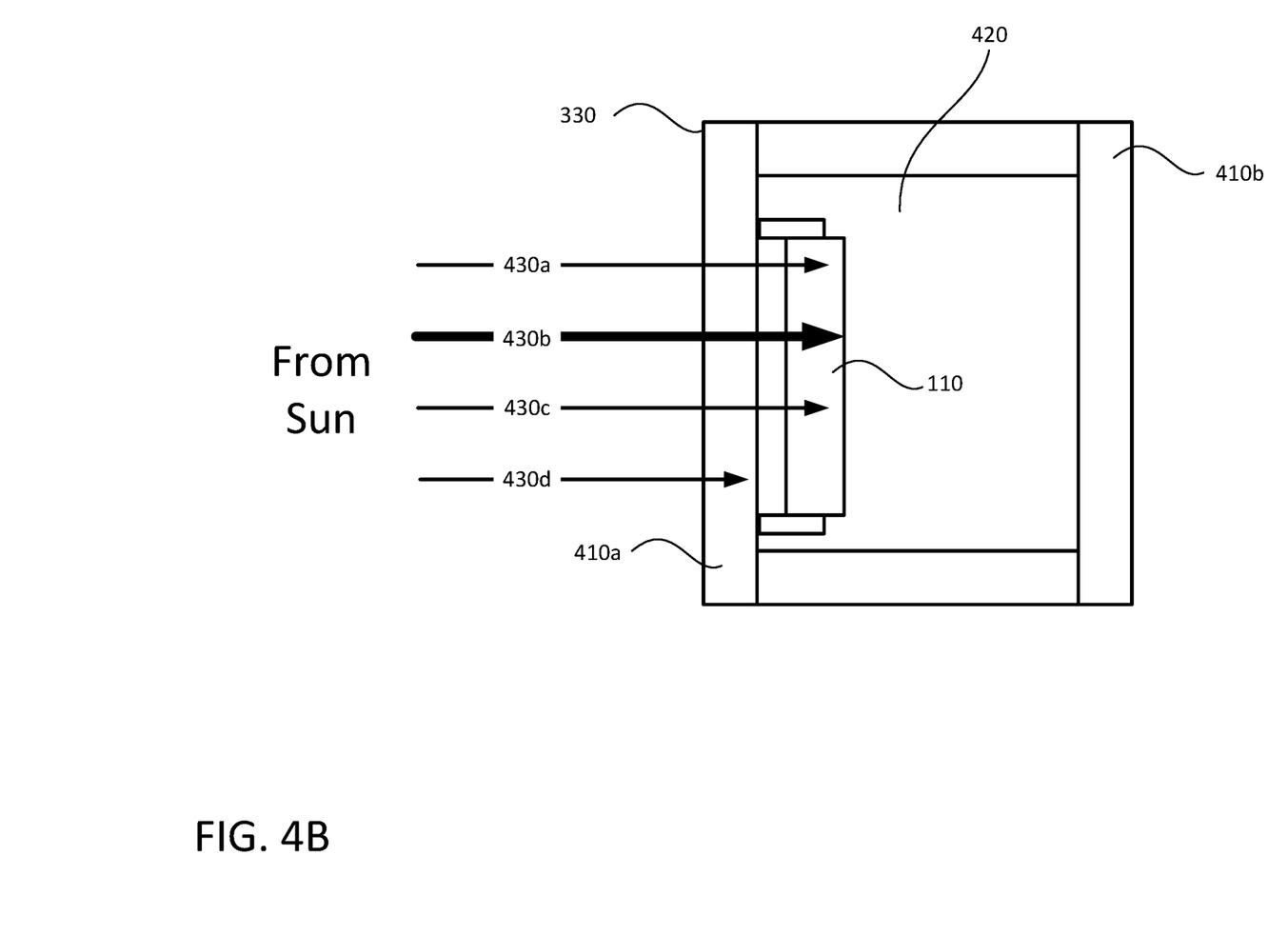

FIGS. 4A and 4B illustrate positions of a detector array 110 of an SRIS 100 on a craft 330 undergoing NDI, according to aspects of the present disclosure. In FIGS. 4A and 4B, the first structural element 410a (generally, structural element 410) is sunward relative to the second structural element 410b, and the second structural element 410b is leeward to the first structural element 401b (i.e., "behind" the first structural element 410a relative to the Sun 320). The detector array 110 is positioned leeward to the structural element(s) 410 subject to NDI. FIG. 4A illustrates the detector array 110 positioned leeward to both the first structural element 410a and the second structural element 410b, whereas FIG. 4B illustrates the SRIS 100 positioned leeward to the first structural element 410a, but sunward to the second structural element 410b. The structural elements 410 may include physical elements of the hulls, fuselages, wings, envelopes, solar collectors, etc. of various craft 330 and in some aspects define an enclosed space 420 between several structural elements 410 (e.g., the living quarters of the ISS, the cockpit of a capsule or aircraft) that may be pressurized/filled with air, a lifting gas, fuel, heat transfer/sinking medium, water, etc.

Depending on the thicknesses and densities of various materials and components that make up a structural element 410, the solar radiation 350 may be blocked (e.g., reflected or attenuated) before reaching the detector array 110. In FIGS. 4A and 4B, the solar radiation 350 includes an example first wave 430a, second wave 430b, third wave 430c, and fourth wave 430d (collectively or generally, wave 430). Although the Sun 320 outputs solar radiation 350 in broad swaths of the electromagnetic spectrum, the example waves 430a-d discussed herein correspond to the subset of the waves 430 in the spectrum that the detector array 110 is tuned to receive. Due to the Sun 320 be a large and distant radiation source (relative to the craft 330 undergoing NDI), each of the example waves 430a-d are substantially parallel to one another and substantially even in intensity at a given time (although the intensity may vary over time). Accordingly, the detector array 110 receives the waves 430 passing through the structural elements 410 at corresponding regions of the detector array 110 to construct an image of the structural elements 410 between the detector array 110 and the Sun 320.

In one example, with reference to FIG. 4A, the first wave 430a passes through the first structural element 410a and the second structural element 410b before energizing a first portion of the detector array 110. The second wave 430b also passes through the first structural element 410a and the second structural element 410b and energizes a second portion of the detector array 110, but with a different amount of energy than the first wave 430a. The different amount of energy imparted by the first wave 430a and the second wave 430b may be due the material of the first structural element 410a or the second structural element 410b absorbing, reflecting, or otherwise attenuating the first wave 430a and the second wave 430b differently at different points of the craft 330. For example, the portion of the craft 330 that the first wave 430a passes through may include a metal wall of a first thickness, and the portion of the craft 330 that the second wave 430b passes through may include a metal wall of a different thickness. In another example, the first wave 430a passes through different materials than the second wave 430b (e.g., different metals, glasses, ceramics, plastics), or additional components of the craft 330 (e.g., a wall covering the first and second portions obscures a conduit that runs at one of the first and second portions), which results in the different received intensities. In the current example, the structural characteristics of the first structural element 410a and the second structural element 410b are such that the third wave 430c is blocked from reception by the detector array 110. Similarly, the first structural element 410a blocks the fourth wave 430d from being received by the detector array 110 at a fourth portion thereof. The detector array 110 digitizes the energizations imparted by the waves 430 such that a radiographic image of the first structural element 410a and the second structural element 410b is produced.

In another example, with reference to FIG. 4B, which may be the same craft 330 as in FIG. 4A with the detector array 110 positioned at a different location, the first wave 430a and the second wave 430b pass through the first structural element 410a before energizing a respective first portion and second portion of the detector array 110. The different amount of energy imparted by the first wave 430a and the second wave 430b may be due the material of the first structural element 410a or the second structural element 410b absorbing, reflecting, or otherwise attenuating the first wave 430a and the second wave 430b differently at different points of the craft 330. In the current example, the structural characteristics of the first structural element 410a and the second structural element 410b are such that the third wave 430c is blocked from reception by the detector array 110. Similarly, the first structural element 410a blocks the fourth wave 430d from being received by the detector array 110 at a fourth portion thereof. The detector array 110 digitizes the energizations imparted by the waves 430 such that a radiographic image of the first structural element 410a is produced.

The radiographic image produces a negative image of the structural elements 410 between the Sun 320 and the detector array 110; portions of the craft 330 that block more of the solar radiation 350 appear darker than portions that block less solar radiation 350. In some aspects, the SRIS 100 compares the radiographic image against a known schematic view (including blueprints, design renders, and previously captured radiographic images) for the imaged structural element(s) 410 and identifies non-conformances between the radiographic image and the schematic view. In one example, the SRIS 100 compares a first radiographic image of a hull section of a spacecraft taken at a time prior to a debris strike event is compared against a second radiographic image of that hull section taken at a time after the debris strike event to evaluate the integrity of the hull section.

In some aspects, when multiple structural elements 410 are present in a combined radiographic image (e.g., the first structural element 410a and the second structural element 410b as in FIG. 4A), the SRIS 100 applies a masking image of one of the structural elements 410 to the combined radiographic image to produce an decomposited view of the structural element 410. A positive image of the undesired structural element 410 is applied to the combined radiographic image; lightening portions of the combined radiographic image that appear dark in the masking image of the undesired structural elements 410 to produce an decomposited image of the desired structural elements 410. The SRIS 100 may use known schematic views (including blueprints, design renders, and previously captured radiographic images) of sunward or leeward structural elements 410 as the masking view to mitigate the effects of those undesired structural elements 410 from the combined radiographic images and thus highlight the desired structural elements 410 for further analysis.

Figure 5:
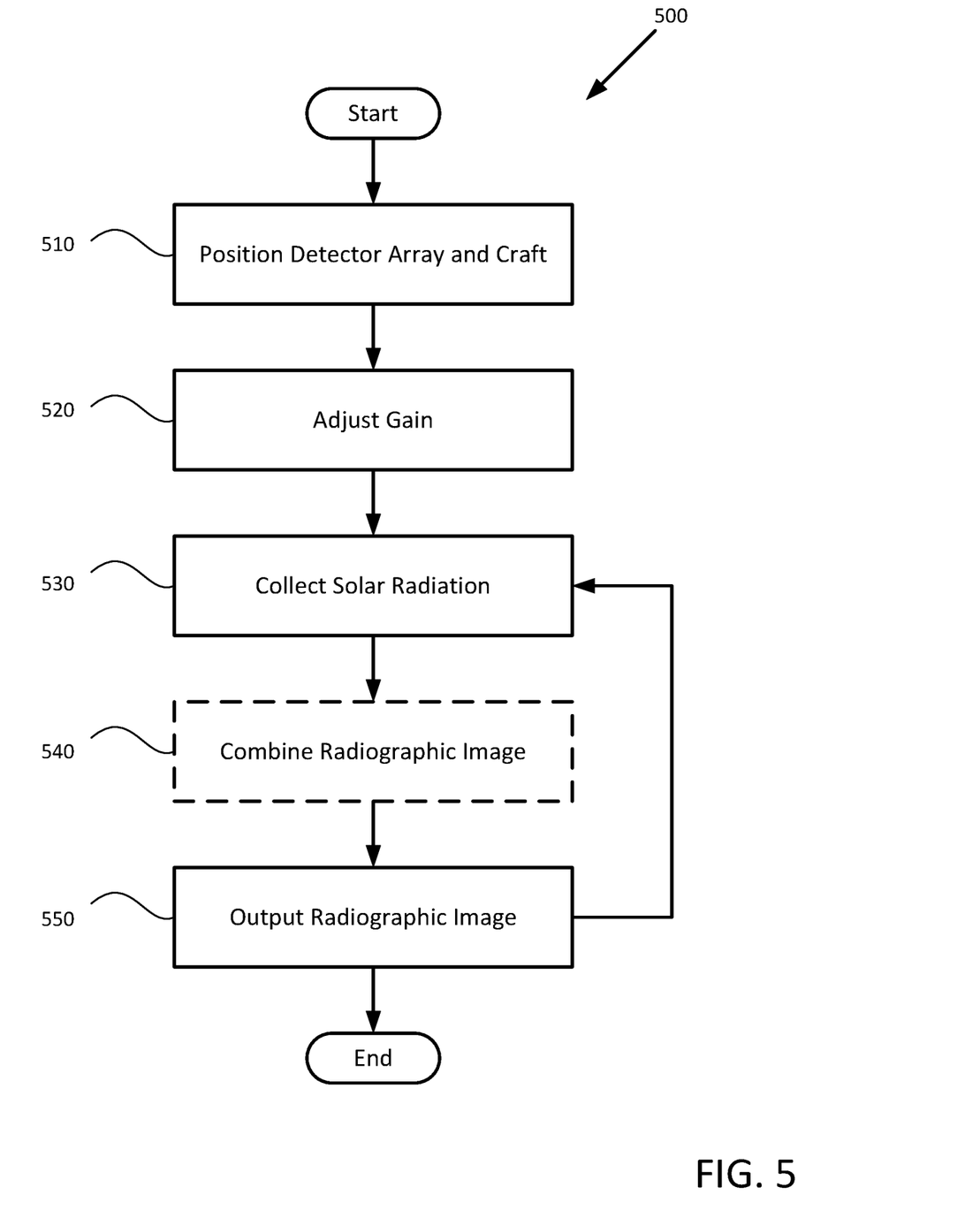
FIG. 5 is a flowchart of a method for Non-Destructive Inspection, according to aspects of the present disclosure.

FIG. 5 is a flowchart of a method 500 for NDI of a craft 330, according to aspects of the present disclosure. Method 500 begins with block 510, where a detector array 110 and a craft 330 to be inspected are positioned relative to the Sun 320. In some aspects, the craft 330 maneuvers to position a structural element 410 for inspection sunward relative to the detector array 110. In some aspects, the detector array 110 is moved to place the detector array 110 leeward to the structural element 410 for inspection. The attachment features 111 secure the detector array 110 in place relative to the structural element 410 for inspection. Additional structural elements 410 may be sunward to the detector array 110 based on the construction of the craft 330 and whether the detector array 110 is located in an enclosed space 420 within the craft 330 or externally to the craft 330.

At block 520, the image analyzer 120 adjusts the gain for the detector array 110 to avoid saturating the scintillator 112 during NDI. In some aspects, the image analyzer 120 calculates the trajectory 340 of the craft during NDI to determine the gain to apply to the detector array 110. When calculating the trajectory 340, the image analyzer 120 considers how long the craft 330 is expected to be in the exposed region 360 and in the shielded region 370, the expected intensity of the solar radiation 350 over the trajectory 340, and a sensitivity of the scintillator 112 to the solar radiation 350. For example, a craft 330 operating within the Earth's magnetic field is expected to receive higher intensity radiation than a craft 330 operating outside of the Earth's magnetic field, and the image analyzer 110 adjusts the gain accordingly. In some aspects, the trajectory 340 may include several entries to/exits from the exposed region 360 (e.g., multiple orbits around the object 310, several flights over a threshold altitude). The image analyzer 120 adjusts the gain for the detector array 110 by one or more of: adjusting a size of an aperture of a radiation shield for the scintillator 112, whether a radiation shield is applied/removed from the scintillator 112 for a portion of the trajectory 340, a recommended time or altitude of a flightpath within the exposed region 360, etc.

At block 530, the detector array 110 collects solar radiation 350 that passes through the structural element 410. In some aspects, the waves 430 that are collected are in the X-ray spectrum. In various aspects, the detector array 110 collects solar radiation 350 for a predefined amount of time, a predefined number of orbits, until a user or the image analyzer 120 indicates that the clarity of the radiographic image 222 satisfies a clarity threshold, or a portion of the scintillator 112 is saturated.

Blocks 510-530 of method 500 are performed inflight—while the craft 330 is operating is space or the atmosphere. Blocks 540-550 are performed either inflight or once a flight is concluded by an image analyzer 120 on the craft 330, on another craft 330 (e.g., the ISS receives radiographic data for inspecting a docked capsule), or at a groundside facility that receives the radiographic data from the detector array 110.

Optionally at block 540, the image analyzer 120 combines the radiographic image 222 produced from the solar radiation 350 collected at block 530 with another image. In some aspects, several radiographic images 222 are combined into a final radiographic image 222 over several trips of the craft 330 through the exposed region 360; multiple exposures are used in some aspects to produce one final radiographic image 222. In some aspects, a masking view is merged with the radiographic image 222 to highlight a particular structural element 410 in a composite radiographic image 222 by removing other structural elements 410 from the composite radiographic image 222. When decompositing a composite radiographic image 222 of several structural elements 410, a masking image (taken from a previously collected radiographic image 222 or a schematic/blueprint image) of the undesired structural elements 410 is used to lighten portions of the composite radiographic image 222 that appear dark in the masking image to produce a decomposited image that mitigate the effects of the undesired structural elements 410 from the composite radiographic image 212 and thereby highlight desired structural elements 410

At block 550, the image analyzer 120 outputs the radiographic image 222. In various aspects, the image analyzer 120 saves the radiographic image 222 in the memory 220, which may be accessed to display the radiographic image 222 on a monitor or a paper/film readout or transmitted via the transceiver 130 to an external computing device. In some aspects, the transceiver 130 transmits the radiographic image 222 while the craft 330 is in the shielded region 370 and not while the craft 330 is in the exposed region 360. Method 500 may then conclude or return to block 530 to collect additional solar radiation 350.

For example, a satellite may undergo NDI to produce a radiographic image 222 of a section of the satellite's hull over the course of several orbits around the Earth. When the satellite is in the exposed region 360 of the orbit, the detector array 110 collects solar radiation 350 (per block 530) and when the satellite is in the shielded region 370 of the orbit (i.e., is leeward of the Earth) and the detector array 110 is not currently collecting solar radiation 350, and outputs the radiographic image 222 as the scintillator 112 de-energizes. A radiographic image 222 can thus be developed over repeated exposures to the solar radiation 350 across several orbits with the output from each orbit combined to form a final radiographic image 222 and merged with a masking view to remove undesired structural elements 410 from the radiographic image.

In the current disclosure, reference is made to various aspects. However, it should be understood that the present disclosure is not limited to specific described aspects. Instead, any combination of the following features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A method of Non-Destructive Inspection of a spacecraft, comprising:
   positioning a detector array leeward to a structural element of the spacecraft relative to the Sun;
   collecting, by the detector array while the spacecraft is in flight, solar radiation passing through the structural element; and
   outputting a radiographic image based on the solar radiation collected.

2. The method of claim 1, wherein positioning the detector array further comprises:
   maneuvering the spacecraft to present the structural element sunward relative to the detector array.

3. The method of claim 1, wherein positioning the detector array further positions an additional structural element between the detector array and the Sun.

4. The method of claim 3, further comprising, prior to outputting the radiographic image based on the solar radiation collected:
   merging the radiographic image with a masking view of the additional structural element to produce an unmasked view of the structural element.

5. The method of claim 1, further comprising:
   calculating a trajectory of the spacecraft for collecting the solar radiation; and
   adjusting a gain of the detector array for collecting the solar radiation so that a scintillator of the detector array does not saturate over the trajectory.

6. The method of claim 5, wherein the trajectory includes multiple orbits that include an exposed region of the trajectory and a shielded region of the trajectory, wherein the detector array de-energizes while in the shielded region.

7. The method of claim 1, wherein the solar radiation collected is X-ray spectrum radiation.

8. A Solar Radiation Inspection System (SRIS), comprising:
   a detector array, including:
      a scintillator, configured to energize in response to collecting solar radiation passing through a physical structure; and an array of digital detectors corresponding to regions in the scintillator, the digital detectors of the array are configured to digitize a signal when a corresponding region in the scintillator is energized; and an image analyzer, including:
 a processor; and
 a memory including program instructions that when executed by the processor enable the image analyzer to construct a radiographic image of the physical structure based on the digitized signals received from the detector array.

9. The SRIS of claim 8, further comprising an attachment feature for the detector array including at least one of:
 a hook and loop fastener;
 a bolt;
 an adhesive;
 a tie-down;
 a magnet; and
 a robotic arm with a selectively engaged clamp.

10. The SRIS of claim 8, further comprising a power source connected to the image analyzer including at least one of:
 a solar cell; and
 an umbilical cord to mate with an external power source of a spacecraft.

11. The SRIS of claim 8, further comprising a transceiver in communication with the image analyzer configured to transmit the radiographic image to an external computing device, the transceiver including at least one of:
 a Bluetooth transmitter; and
 a WiFi transmitter.

12. The SRIS of claim 11, wherein the transceiver is configured to transmit the radiographic image when the scintillator is not collecting the solar radiation and to not transmit the radiographic image when the scintillator is collecting the solar radiation.

13. The SRIS of claim 8, wherein the image analyzer is further configured to merge a masking view of a first structural element with the radiographic image to decomposite the first structural element from a second structural element included in the radiographic image.

14. The SRIS of claim 8, wherein the image analyzer is configured to identify differences in the radiographic image relative to a schematic view of the physical structure.

15. The SRIS of claim 8, wherein the scintillator is a durable scintillating material.

16. The SRIS of claim 8, wherein a gain of the detector array is selectively adjustable based on a time of exposure to the solar radiation and an intensity of the solar radiation.

17. A system, comprising:
 a craft including a first structural element;
 a detector array, connected to the first structural element, wherein the detector array is selectively positionable to be behind the first structural element relative to the Sun, the detector array including a scintillator, configured to energize in response to collecting solar radiation and an array of digital detectors corresponding to regions in the scintillator, the digital detectors of the array are configured to produce a signal when a corresponding region in the scintillator is energized; and
 an image analyzer configured to receive digitized signals from the array of digital detectors and construct a radiographic image of the first structural element based on the digitized signals.

18. The system of claim 17, wherein the craft further includes a second structural element sunward of the first structural element, wherein the image analyzer is further configured to remove a masking view of the second structural element from the radiographic image to decomposite the first structural element and the second structural element in the radiographic image.

19. The system of claim 17, wherein the craft is a spacecraft configured to operate in outer space.

20. The system of claim 17, wherein the craft is an aircraft configured to operate at an altitude above the Troposphere.

* * * * *